(No Model.)
W. H. BACHE.
MANUFACTURE OF BUSHINGS.
No. 500,463. Patented June 27, 1893.
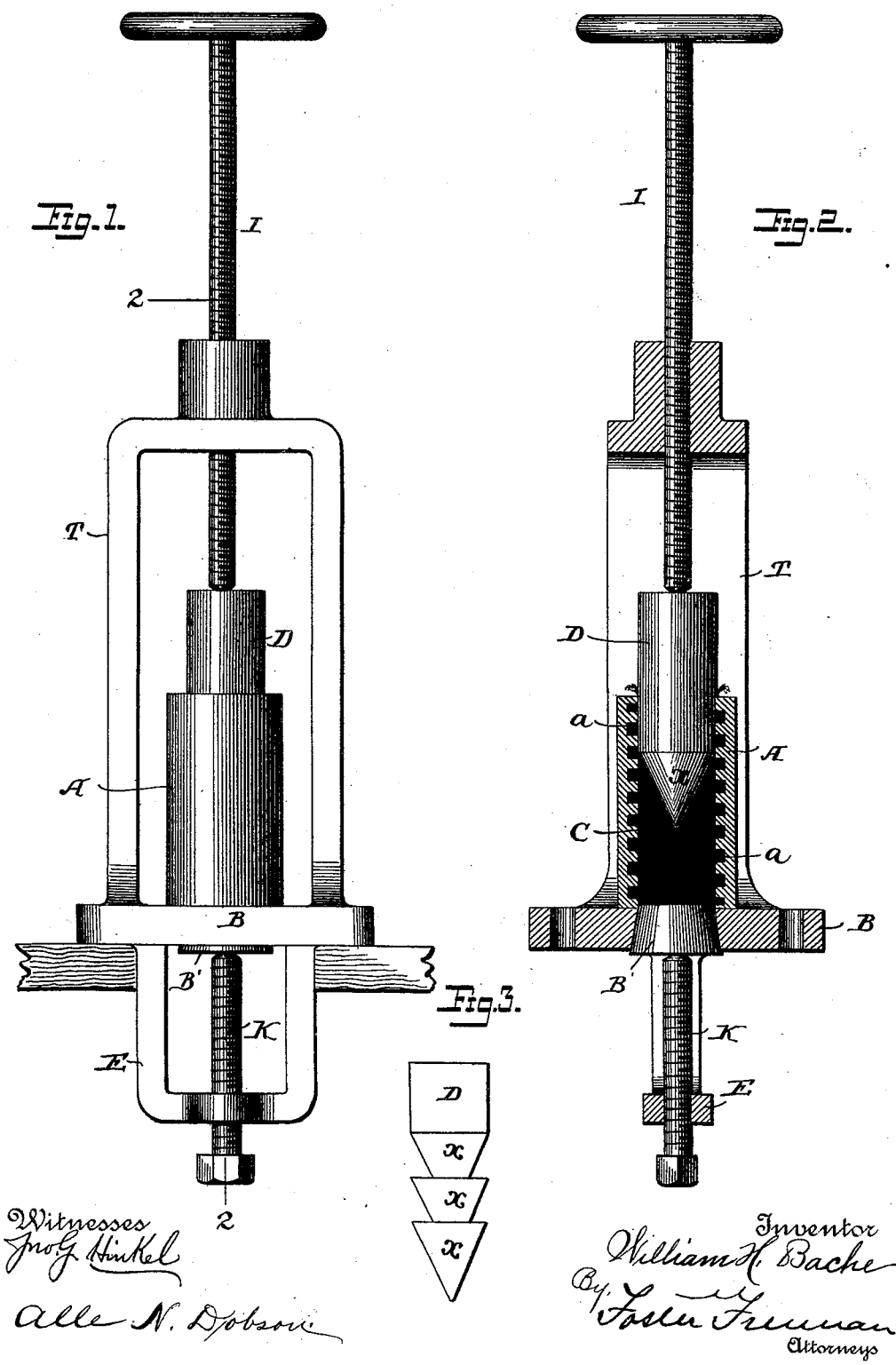

UNITED STATES PATENT OFFICE.

WILLIAM H. BACHE, OF BOUND BROOK, NEW JERSEY, ASSIGNOR TO THE GRAPHITE LUBRICATING COMPANY, OF SAME PLACE.

MANUFACTURE OF BUSHINGS.

SPECIFICATION forming part of Letters Patent No. 500,463, dated June 27, 1893.

Application filed April 25, 1892. Serial No. 430,570. (No model.)

*To all whom it may concern:*

Be it known that I, WILLIAM H. BACHE, a citizen of the United States, residing at Bound Brook, in the county of Somerset and State of New Jersey, have invented certain new and useful Improvements in the Manufacture of Bushings, of which the following is a specification.

My invention relates to hollow bushings and especially to that class which are provided with internal pockets receiving some solid or semi-solid lubricant, and it has for its object to provide means whereby such bushings and like articles can be readily supplied with the lubricating material, which can be properly applied or forced into the pockets thereof, so that it shall be evenly distributed throughout the bearing surface of the bushing or other article. And the invention consists in the devices substantially as hereinafter more particularly pointed out.

Referring to the accompanying drawings, in Figure 1, I have shown in elevation an apparatus for carrying out my improvement; Fig. 2, a section on the line 2—2, Fig. 1. Fig. 3, shows a modified form of plunger.

It is well known that bearings, bushings and the like having recesses or receptacles for the reception of a solid or semi-solid lubricant, like a graphite composition or otherwise, furnish a successful and practical bearing, but it has been found in practice that it is extremely difficult to properly supply the internal receptacles with the lubricating material, especially in such articles as hollow bushings and the like. One way of supplying this material is set forth in Patent No. 300,025, and while this overcomes many of the objections, it has been found in practice that it is practically impossible to properly pack the lubricant in all the grooves so that it will be evenly distributed, it usually resulting that the upper grooves receive a considerably smaller quantity of lubricating material than the lower ones, while the pressure is greater. It is in order to avoid these difficulties that my present invention is made and in the accompanying drawings, A, represents a hollow bushing, shown in longitudinal section, provided with a series of recesses or receptacles $a$.

C, represents a mass of lubricating material which is preferably a graphite composition, which is placed in the bushing in any convenient way, preferably being packed down as it is supplied by means of a suitable rammer or otherwise, while the bushing may be conveniently supported upon a suitable base B. When the bushing has been filled with a sufficient quantity of the composition the mandrel or plunger D, is applied to force the proper quantity under a uniform pressure into all the receptacles or recesses of the bushing. This mandrel D, is made with one or more tapering or inclined faces $x$, preferably at the end, the body being of a contour substantially like the internal shape of the bushing and of substantially the same size, while its end is preferably pointed. In Fig. 1, the pointing of the end forms the tapering or conical face $x$. In Fig. 3, there is a series of such faces. It will be seen that as soon as pressure is applied to the mandrel, which is done in any suitable way, as by machine or hand power, the body of the mandrel closes the bushing and confines the material therein and the tapering face or faces commence to force the composition from the center outwardly until the body of the mandrel or plunger reaches the edge of the bushing, at which time the composition will be condensed, and the plunger is then forced completely through the bushing, and each recess will receive a proper amount of material which will be deposited under a uniform pressure. After the plunger is forced entirely through the bushing all the grooves are entirely filled under the same conditions and the surface will be finally smoothed and polished. To permit this complete passage of the plunger through the bushing, I support the bushing on the table or base B, having a removable section or plug B', of about the diameter of the plunger, which is withdrawn as the point of the plunger is brought to the end of the bushing to permit the pointed end to pass wholly beyond the bushing. Thus said plug may be supported by a screw K, turning in a yoke E, and which is carried down to lower the plug.

While the plunger D, may be moved in any suitable way, a convenient way is illustrated, being a screw I, turning in a yoke T, secured to the base B.

In some instances I find it desirable to subject the bushing to heat, under which treatment the composition swells more or less and then the mandrel is again forced into the bushing and this operation may be repeated as many times as is necessary until the result is that a practically perfect bushing is produced having all parts supplied with the proper amount of composition packed under an equal pressure, preventing any undue wear at one end or the other and perfectly lubricating every part.

While I have shown my invention as applied to cylindrical bushings and consequently have shown a cylindrical mandrel, it will be understood, of course, that it may be applied to bushings and similar devices of various shapes, and the same results can be accomplished and I do not therefore limit my invention to the precise construction and arrangement set forth.

What I claim is—

1. The combination of a support for a hollow cylindrical bushing having an opening opposite the opening to the bushing, the plunger adapted to pass through the said bushing and also through the opening in the support therefor, means for moving the plunger into and through the bushing, and a plug supported in the opening for the bushing, and arranged to be movable outward, substantially as described.

2. The combination of the base adapted to support a hollow recessed bearing, a plunger having a contracted end adapted to the smaller diameter of the bearing, means for forcing the plunger toward the base, the latter provided with an opening for the passage of the end of the plunger, a plug which completely closes the said opening and is movable outwardly and means for holding said plug in place in the opening, substantially as described.

3. The combination with the support for a hollow bearing of a plunger having a head with a tapering end and tapering faces $x$ and adapted to the lesser diameter of the bearing, substantially as described.

In testimony whereof I have signed my name to this specification in the presence of two subscribing witnesses.

WILLIAM H. BACHE.

Witnesses:
ALLE N. DOBSON,
CHARLES E. GRAVES.